Oct. 18, 1966 R. A. BUTLER 3,279,395
DOUGH SHEETING APPARATUS
Filed Nov. 23, 1962
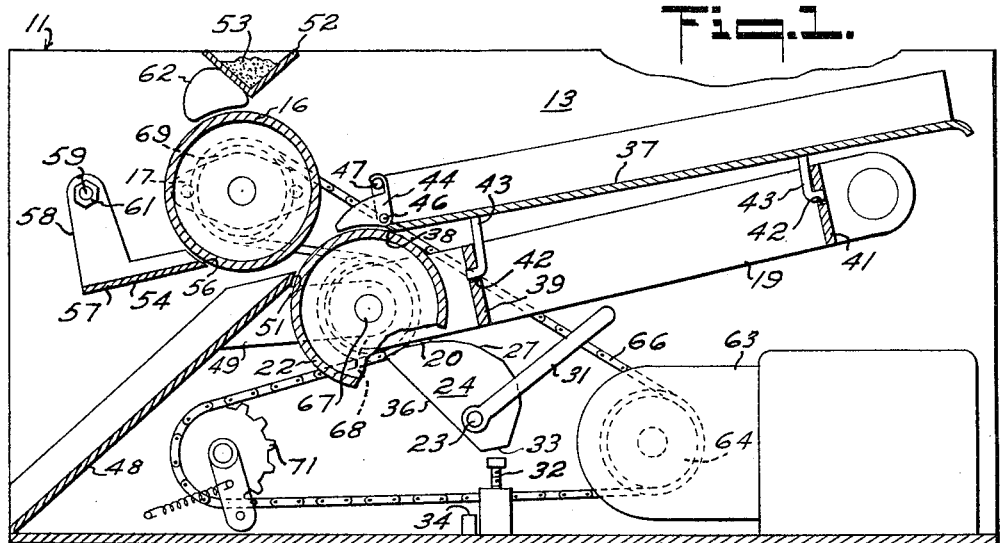
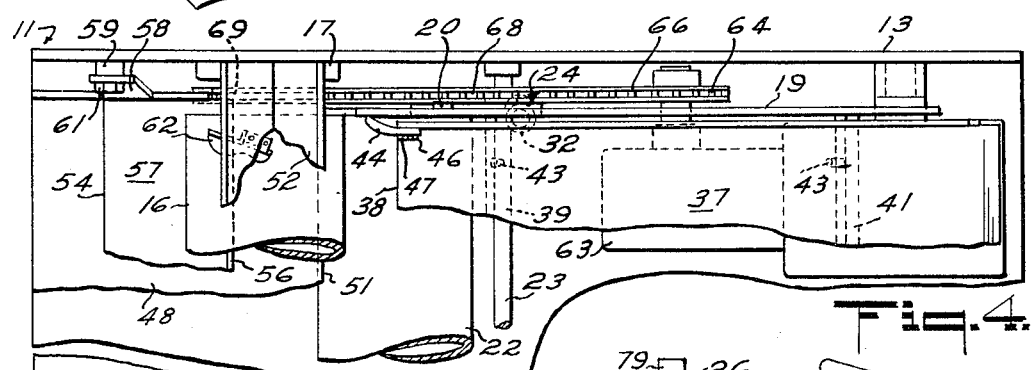
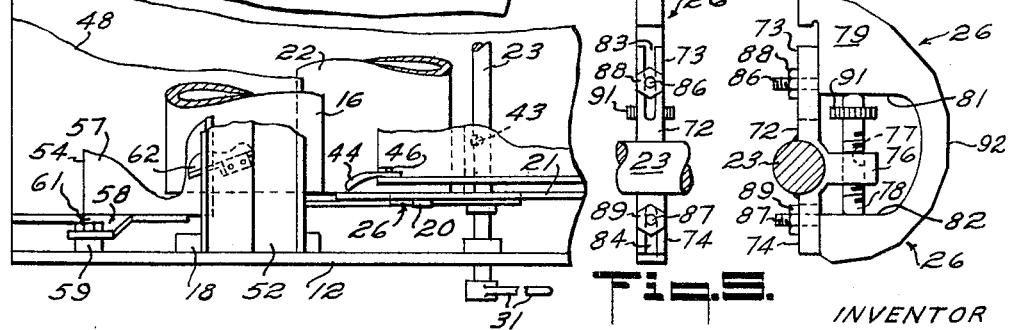
INVENTOR
ROLLO A. BUTLER
BY
Gardner & Zimmerman
ATTORNEYS

United States Patent Office 3,279,395
Patented Oct. 18, 1966

3,279,395
DOUGH SHEETING APPARATUS
Rollo A. Butler, 12595 Bard St., San Jose, Calif.
Filed Nov. 23, 1962, Ser. No. 239,586
14 Claims. (Cl. 107—12)

This invention relates generally to improvements in dough forming apparatus, and more particularly to an apparatus of the type having two spaced rollers for sheeting dough into desired thicknesses for subsequent baking or like operations.

In many instances it is necessary or desirable to provide relatively large quantities of dough which have been rolled or sheeted to a specified thickness. By way of example, in the production or articles such as pizzas, it is necessary to first produce a relatively thin sheet or layer of dough before the meats, condiments and other foodstuffs are placed on the upper surface of the layer preparatory to baking. While in the past there have been provided different forms of devices for producing such sheeted dough, such devices have not proved satisfactory from either operational, cost, or maintenance considerations.

In order to provide a relatively thin sheet of dough from a dough rolling apparatus of the type having two simultaneously rotating rollers, it is not possible merely to adjust the spacing of the rollers for the thickness ultimately desired. Rather, it has been found necessary to start out first with a relatively thick wad of dough and insert this wad through the rollers with a relatively wide spacing thereof. The thick sheet produced must then be passed through the rollers again, but with a slightly narrower spacing. This operation is repeated several times, as is subsequently more fully described, each time bringing the rollers closer together, until a sheet of dough having the desired thickness and firmness has been formed. Consequently, it is highly advantageous to have a dough rolling apparatus wherein the spacing of the rollers may be readily varied with a minimum of time and effort.

Accordingly, it is a main object of the present invention to provide apparatus for rolling or sheeting dough in which means are provided for producing a positive and accurate selection of dough thickness, and which thickness may be readily varied to facilitate the formation of a thin sheet of dough through repetitive rolling operations at progressively smaller thicknesses.

A further object is to provide apparatus of the type described in which the spaced rollers thereof may be quickly separated to their maximum spacing by a single movement of an operating lever arm, thereby affording a safety release should the operator's hand enter into dangerous proximity with the rollers.

Still another object is to provide apparatus of the character described having dough loading and unloading trays adapted for positioning tangentially adjacent a transversely movable roller regardless of the position of such roller.

Another object is to provide apparatus of the character described having generally coextensive spaced rollers and means for accurately aligning the rollers to provide parallel disposition thereof.

A further object is to provide apparatus of the character described having parallel spaced rollers and which is adapted to have dough fed into the apparatus from the front or rear portions thereof whereby the formation of an exceptionally thin sheet of dough is greatly facilitated, as will become apparent with the subsequent description.

Another object is to provide apparatus of the character described having means for retaining loose flour in a manner which greatly facilitates the sprinkling of such flour upon all surfaces on which the sheeted dough is to be placed during the sheeting operation.

Yet another object is to provide apparatus of the character described which is extremely lightweight, simple in construction and operation, and which is capable of performing over extended periods of time without undue maintenance or other difficulties.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a cross-sectional side elevational view of the apparatus of the present invention.

FIGURE 2 is a top plan view of the apparatus with portions of the structure being broken away in order to more clearly indicate the internal features of construction.

FIGURE 3 is a fragmentary view of one of the novel cam members of the instant apparatus.

FIGURE 4 is a side view of another of the novel cam members, which is adapted to align the two rollers in accurate parallel disposition.

FIGURE 5 is an end view of the cam shown in FIGURE 4.

As hereinabove explained, the apparatus of the instant invention is adapted for producing sheeted dough, and, in broad terms generally includes a pair of driven roller members suitable for receiving prepared dough and effecting a sheeting or rolling thereof. In order to provide different thicknesses in the sheeted dough which may be required as previously noted, one of the rollers is adapted with means for effecting generally radial movement from and towards the other roller, and in this manner the roller spacing is selectively varied. For reasons to be noted, it is preferable that the axes of the two rollers are disposed in a plane inclined at substantially 50° from the vertical where the rollers are positioned for their minimum spacing. Suitable drive means are provided for effecting simultaneous contra rotation of the rollers.

In more detail now, and referring to the drawing, the apparatus of the present invention is seen to include a support frame 11 having spaced side walls 12 and 13, and a floor 14, extending between the two side walls. A first roller 16 extends between and is journalled in the side walls by means of bearings 17 and 18. Movable support means preferably comprising a pair of pivotable support arms 19 and 21 are mounted respectively on each of the side walls, and a second roller 22 is journalled between the arms in generally parallel coextensive relationship with the first roller 16.

The pivotal movement of the support arms is adapted to move the roller 22 generally radially relative to the roller 16 as shown in the drawing, and thus such movement of the support arms serves to vary the spacing between the two rollers. Adjustable cam means are provided to control the position of the support arms thereby allowing for selective adjustment of the roller spacing. More particularly, a cam shaft 23 is journalled between the side walls 12 and 13 and has mounted thereon two cam members 24 and 26 each disposed subjacent one of the support arms 19 and 21. As best depicted in FIGURE 3, the cams each have an eccentric peripheral edge portion 27 with portions thereof having varying radial distances from the cam shaft 23. The arms 19 and 21 rest upon the cams, and as the cam shaft is selectively rotated the arms are pivoted about their mountings to move the roller 22 transversely relative to the roller 16 to vary the spacing therebetween. Preferably, a pair of plates 20 constructed of graphite steel are secured subjacent the arms 19, 21 for bearing on top of the cams 24, 26, and assure ready movement of the rollers and long wear of the friction engaging portions.

An important feature of the invention relates to the configuration of eccentric edge portion of the cams 24, 26. In more detail, it is seen that the peripheral edge 27 of each cam includes circumferentially adjacent flat or linear portions 28 each being spaced at different radial distances from the cam shaft. That is, radial lines extending normally through each of the flat portions 28 have progressively varying lengths. Furthermore, each flat portion 28 has its ends or corners 29 disposed on either side of a radius from the shaft 23 extending perpendicularly through the respective flat portion, and in this manner the support arms are adapted to be supported on the flat portions of the cams in a stabilized position. Regardless of any load on the support arms, as for example through loading on the roller 22, the cams maintain the arms in any selected position as determined by the selected cam portion 28. An operating lever arm 31 is secured to the camshaft 23 to provide simple means for rotatably positioning the cams, and thus a short pivotal movement of the operating arm, necessarily less than 360°, serves to selectively vary the spacing of the two rollers. The disposition of the lever arm 31 relative to the cam shaft 23, shown in FIGURE 1 with the arm extending upwardly to the right when the cam members are positioned for minimum roller spacing, is important with regard to a safety feature of the invention as will be subsequently more fully described.

It is generally desirable to have means for adjustably limiting the minimum spacing between the rollers, this serving in one regard to prevent damage from jarring together of the rollers. Also, by selecting the minimum spacing, it is possible to produce numerous quantities of sheeted dough accurately having the same final thickness. To this end, adjustable stop means are provided for engaging one of the cam members when it is being rotated to bring the rollers together. As shown in FIGURE 1, a vertically adjustable jack screw 32 or the like is disposed below the cam member 24 and positioned to intercept the edge 33 of the cam when it is rotated clockwise, as viewed in the drawing. By varying the vertical height of the screw 32, the maximum extent of clockwise rotation of the cam member may be varied, and the minimum spacing of the rollers is thus limited. A fixed stop member 34 is preferably disposed in the path of one of the cam members as shown in FIGURE 1 to limit the maximum spacing of the rollers. Thus, upon counter-clockwise rotation of the cam shaft the edge 36 abuts against the stop 34 to prevent further separation of the rollers.

Another feature of the invention relates to a loading pan 37 mounted on the support arms 19 and 21, and having an edge 38 in generally tangential relation with the periphery of the roller 22. Since the pan and the roller 22 are both mounted on the pivotable support arms, movement of the roller with the support arms does not affect the positioning of the pan relative to the roller. It is noted that the arms 19 and 21 have a pair of spaced cross braces 39 and 41 secured therebetween, with apertures 42 extending transversely through the braces. Depending hooks 43 or the like are secured to the tray 37 and are engageable in the apertures 42 for mounting the tray. In order to remove the tray for purposes of cleaning, etc., the braces 39 and 41 are manually flexed apart from one another thereby releasing the hooks 43 from the apertures 42 to allow upward movement of the tray. A pair of side guide plates 44 are preferably provided adjacent the edge 38 of the tray 31 to assure that the dough is properly centered when being inserted into the rollers. To prevent binding against the roller 22 when the tray is being removed, the guides 44 are preferably pivotally secured to the tray adjacent the rollers as depicted at 46. A stop member 47 is positioned on the tray to prevent the guide 44 from pivoting forward into contact with the roller 22 while the tray is in its operative position. It is noted that the guides 44 each are flared outwardly adjacent their lower edges, and have rounded corners to prevent the dough from catching or tearing on the guides, as is best seen in FIGURE 2.

An unloading pan 48 is pivotally secured by mounting arms 49 to the support arms 19 and 21 about the same axis as the roller 22, and has an edge 51 in generally tangential disposition relative to the periphery of the roller 22. Thus, similarly to the tray 37, the pan 48 remains in its position relative to the roller 22 regardless of pivotal movement of the roller. It is noted that the pan 48 may be pivoted upwardly to facilitate cleaning the instant apparatus in the region adjacent the floor 14 beneath the rollers. This feature, in conjunction with the removable tray 37 as previously described, is seen to adapt the instant apparatus for easy cleaning and maintenance.

Another important feature of the invention is directed towards a transversely disposed tray 52 secured between the walls 12 and 13 generally adjacent the top of the frame 11. The tray 52 comprises a pair of angularly disposed generally planar members which intersect along a line at the bottom of the tray, and loose flour 53 is retained in the tray. As is more fully described below, the loose flour is generally used for dusting various surfaces, as for example the tray 37, unloading pan 48, and the work surface disposed forwardly of the instant apparatus, prior to having moist dough come into contact with such surfaces. Usually, a person grasps the loose flour out of the tray with one hand and flicks it over all the surfaces to be dusted. In the past, such trays have generally been provided with a flat horizontal bottom and vertically upstanding sides adjacent the periphery of such bottom. When the flour supply begins to diminish with such conventional trays, it becomes difficult to grasp the loose flour with one's fingers, particularly when there remains only a thin layer of flour in the tray. With the instant tray 52, as the flour is used up the remaining flour settles to the bottom corner of the tray, and virtually all of the flour can be readily grasped and removed with little difficulty.

A scraper bar 54 is mounted transversely between the side walls 12 and 13 and is disposed in generally parallel adjacent relationship with the roller 16. The bar 54 includes an edge 56 closely spaced from the periphery of the roller 16 and serves to prevent dough from sticking to the roller. Preferably, the scraper bar is provided with an elongated central portion 57, which includes the aforementioned edge 56, and two transversely extending side bracket portions 58 adjacent the ends of the portion 57. The side portions are pivotally mounted on stub shafts 59 extending from the side walls, and lock means such as nuts 61 threadedly mounted on the stub shafts are used to secure the scraper bar in its position adjacent the upper roller. In normal usage, it has been found desirable to space the scraper bar edge 56 approximately $10/1000$ of an inch from the roller 16. Sometimes, however, it is desirable to slightly bow the scraper bar inwardly towards the roller to have a spacing of about $5/1000$ of an inch at the center portions of the bar. It is noted that the provision of the side mounting brackets 58 enables such a bowing to be provided in the scraper bar, merely by slightly bending the bar and brackets.

A second pair of guide plates 62 are preferably disposed adjacent the upper surface of the upper roller 16 alongside the edges thereof, and serve to center the sheeted dough as it is fed into the apparatus from the front thereof, as is more fully described below. The guide plates 62 may be secured subjacent the flour tray 52, and preferably are inclined inwardly as is best shown in FIGURE 2. As with the previously described guide plates 44, the guides 62 are also provided with rounded edges to prevent dough from catching and tearing thereon.

As regards the drive means for effecting a simultaneous contra rotation of the rollers 16 and 22, a motor 63 is mounted on the frame 11 and has a sprocket 64 for driving a chain 66. The shaft 67, on which the roller 22 is mounted, has a sprocket 68 secured thereto, and a similar sprocket 69 is mounted on the roller 16. The chain 66 is wound around the sprockets 68 and 69 as shown in FIGURE 1 for rotating the rollers in the manner described. The chain 66 is also disposed around a spring mounted idler sprocket 71 which serves to take up the slack in the chain 66 as the spacing of the rollers is varied.

In order that the two rollers be accurately aligned in parallel relationship, a further feature of the invention relates to means for adjusting the rollers to provide for such positioning thereof. In more detail, reference is made to FIGURES 4 and 5 wherein is shown the cam 26, which serves to support the pivot arm 21. It should be noted that the two rollers when mounted transversely between the side walls are initially disposed in an accurate parallel relationship. However, after the machine has been used steadily for a while during its wearing in period, as for example the first few weeks to a month, a slight adjustment may become necessary. While slight variances from the parallel are generally not significant, it is important to assure that the rollers are parallel when brought together for minimum spacing, as for example to produce dough having a $\frac{1}{16}''$ to $\frac{1}{8}''$ thickness. With such thin sheets of dough, variances in thickness owing to non-parallel alignment of the rollers become less tolerable, and hence should be remedied. To this end, the cam 26 is provided with a member 72 secured rigidly to the cam shaft 23, which member includes two elongated portions 73, 74 extending in diametrically opposed directions. A third portion 76 extends transversely of the portions 73, 74, and has an internally threaded bore 77 through which a threaded stud 78 extends in generally parallel relationship with the portions 73, 74. A cam portion 79 of the cam 26 is slidably mounted on the member 72 and has spaced inner surfaces 81, 82 in abutment with the ends of the stud 78, the portion 79 thereby being movably responsive to movement of the stud in the bore 77. In more detail, and looking at FIGURE 5, the portions 73, 74 are seen to have elongated slots 83, 84 through which extend studs 86, 87 which are substantially integrally secured to the cam portion 79. The studs 86, 87 are preferably threaded and have nuts 88, 89 or the like secured thereto to tighten the cam portion 79 to the member 72. A knurled knob 91 is preferably provided on the stud 78 to facilitate rotation thereof. It is noted that alignment means as just described need be provided only on the cam 26, and the cam 24 as shown in FIGURE 1 is a solid member having no alignment means. To use the foregoing alignment means, the rollers are brought close together, and if desirable into contact with one another. If they are not parallel or do not contact uniformly along the length thereof, the knurled knob 91 is rotated to move the cam portion 79 relative to the cam shaft 23, thereby raising or lower one end of the roller 22. When accurate alignment in this position is achieved, the nuts 88, 89 are tightened to secure the cam in place. It should be noted that the foregoing adjustment is not affected by the fact that the two pivot arms 19, 21 are joined by the transverse braces 39, 41 to make a unitary structure. Notwithstanding such structure, the adjustment is used only for changes of the order of $\frac{1}{16}$ of an inch, and there is enough flexibility in the arms 19, 21 and braces 39, 41 to allow for such small degree of relative movement between the two pivot arms 19, 21. It is also pointed out that the alignment means of the cam 26 enable parallel adjustment of the two rollers at positions thereof other than minimum spacing although such adjustment has not heretofore been found necessary. More particularly, and referring to FIGURE 4, it will be appreciated that if adjustment is needed when the rollers are spaced with the cam surface flat portion 92 engaging the pivot arm 21, movement of the stud 78 will be of no avail for such adjustment. In this situation the use of shims between the portions 73, 74 and the cam portion 79 may assist in adjusting the spacing of the cam flat 92 relative to the shaft 23.

In operating the apparatus of the present invention, the lever arm 31 is movable to give the desired spacing between the two rollers. This operation can be made while the rollers are rotating. As an example of one use of the instant apparatus, the steps in preparing sheeted dough for making pizza is described as follows. A ball or wad of dough is first roughly flattened out by hand and then passed through the rollers while they are widely spaced apart. The loose flour retained in the tray 52 is repeatedly scattered over the various trays, pans, and working surfaces during each step of the dough preparation, in order to prevent the dough from sticking. The thick sheet of dough produced from the first pass through the rollers is folded over double and placed on the tray 37. The rollers are then brought slightly closer together and the sheet of dough is again passed through them. It is noted that the instant apparatus is generally placed upon an elongated work table, and it is preferable that a flat work surface (not shown) extends forwardly of the unloading pan 48 and generally coplanar with the floor 14. The work surface should be about 10 feet long, as will become apparent. As the sheet of dough comes on to the unloading pan 48 it is guided by hand out of the machine on to the aforesaid elongated work surface. The sheet is again folded double, and begins to assume a general elongated planar shape, the width thereof necessarily being no larger than the width of the machine. Each time the dough is passed through the rollers from the tray 37 it is first folded double, and the roller spacing is diminished for each rolling. After several passes through the machine in the aforementioned manner, a sheet of dough as long as eight feet will be pulled out of the machine and placed on the work surface in front of the machine.

The last step in the preparation of the sheeted pizza dough is to take this very long sheet of dough and again pass it through the rollers, only this time without folding it double. Previously this step had to be done by making gentle accordian folds in the elongated strip in order to shorten the entire piece to allow it to be lifted up and placed on the loading tray 37 for insertion between the rollers. This was generally found to be a difficult job, and necessarily slowed down the operation. The present invention, however, enables the long sheet of dough to be passed through the rollers from the front of the machine without having to accordian fold it and put it on the tray 37. Instead, the end of the elongated sheet most remote from the apparatus is lifted up and inserted over the top of the roller 16 between the guide plates 62, the latter serving to keep the sheet centered as it passes into the rollers. The sheet then travels down the back of the top roller 16, through the two rollers, and again out onto the unloading pan 48. The disposition of the two rollers with their axes in a plane inclined substantially 50° from the vertical has been found to be very important in assuring that the sheet as it travels over the top of the upper roller will be properly guided down between the two rollers. More specifically, because of the inclination the sheet is travelling partially downwardly through the rollers, and the rolled portion of the sheet after passing out of the rollers is facilitated in its subsequent downward travel on to the pan 48. After the elongated sheet has been fed through the apparatus from the front thereof, as described in the foregoing, it is then sufficiently firm and thin, as for example $\frac{1}{16}$ to $\frac{1}{8}$ of an inch, to be cut up into the familiar circular shapes used in the making of pizzas.

As regards the previously noted safety release feature of the invention, it is seen that counterclockwise rotation of the camshaft as viewed in FIGURE 1 causes the rollers to move apart. The operating arm 31 is secured to the camshaft so that it extends upwardly and to the right, as viewed in FIGURE 1, when the cams are situated to produce a minimum roller spacing. When the operator is standing adjacent the wall 13 of the apparatus and is using his right hand to feed dough into the rollers, the left hand can be crossed in front of the body to grasp the lever arm 31. Should the operator endanger his right hand by getting it caught between the rollers, the left hand can be immediately pulled crosswise in front of the body to move the lever arm on counterclockwise and thereby quickly separate the rollers to their maximum spacing. While experienced operators generally do not endanger themselves in using the instant apparatus, the foregoing safety feature has been found highly advantageous in training new operators until they have become more familiar with the apparatus.

In addition to the foregoing features and advantages, the instant apparatus is readily adaptable for lightweight construction, and weighs no more than about 250 pounds. It will be appreciated that while the apparatus of the present invention is extremely simple in construction and operation, it will produce sheeted dough with a minimum of difficulty and operational problems.

What is claimed is:

1. Apparatus of the character described comprising, in combination, a support frame having spaced side walls, a first roller extending between and journalled in said walls, a pair of support arms each pivotally mounted on one of said walls, a second roller extending between and journalled in said support arms, said second roller being disposed in parallel adjacent relationship with said first roller and movable relative thereto on said support arms, drive means for providing simultaneous contra rotation of said rollers, a cam shaft journalled between said walls, a pair of cams each secured to said shaft respectively subjacent one of said support arms, said cams each having a plurality of flat peripheral edges of varying radial spacing from said cam shaft and adapted to have said support arms selectively supported on corresponding edges of said cams, and means for selectively rotating said cam shaft for varying the spacing of said rollers.

2. Apparatus as described in claim 1 wherein said last named means includes an operating arm secured to said cam shaft for rotation thereof, and stop means being provided for limiting the minimum spacing between said rollers.

3. Apparatus as described in claim 1 further defined by a loading pan supported on said support arms and having an edge portion in substantially tangential disposition relative to the periphery of said second roller regardless of the spacing thereof from said first roller.

4. Apparatus as described in claim 1 further defined by a scraper bar extending between and pivotally mounted on said side walls and having an elongated edge portion in general tangential disposition with the periphery of said first roller, said scraper bar including an elongated transversed extending central portion and upstanding side portions secured adjacent the ends of said central portion, and an unloading pan pivotally mounted on said support arms about the axis of said second roller and having an edge portion in substantially tangential disposition relative to the periphery of said second roller regardless of the spacing thereof from said first roller.

5. Apparatus as described in claim 1 further defined by a loose flour retaining tray extending between and secured to said side walls adjacent the upper portions hereof, said tray having two generally planar members each disposed at an acute angle from the vertical and intersecting one another to form a lowermost bottom corner portion of said flour tray.

6. Apparatus as described in claim 1 further defined by said rollers having the axes thereof in a plane common disposed at substantially a 50° angle from the vertical.

7. Apparatus as described in claim 1 further defined by means for accurately aligning said rollers in parallel relationship being provided on one of said cams, said aligning means including means movably mounting said one cam on said cam shaft for adjusting the position of one end of said second roller relative to the other end thereof.

8. Apparatus as described in claim 2 further defined by said operating arm extending upwardly and rearwardly of said support frame when said rollers are positioned at their minimum spacing, and said arm adapted to be rotated forwardly to separate said rollers to their maximum spacing.

9. Apparatus as described in claim 3 further defined by guide means for centering sheets of dough between the sides of the rollers as the dough is passed therethrough.

10. Dough sheeting apparatus of the character described comprising, in combination, a support frame having a pair of spaced side walls, a first roller extending between and journalled in said walls, a pair of support arms each pivotally mounted on one of said walls, a second roller extending between and journalled in said support arms, said second roller being disposed in parallel adjacent relationship with said first roller and movable relative thereto on said support arms, drive means for providing simultaneous contra rotation of said rollers, a cam shaft journalled between said walls, a pair of cams secured to said shaft respectively subjacent one of said support arms, said cams each having a plurality of flat edges of varying radial spacing from said cam shaft and adapted to have said support arms selectively supported on corresponding edges of said cams, an operating arm secured to said cam shaft for rotation thereof, stop means engageable with said cam for limiting the minimum spacing between said rollers, a loading pan supported on said support arms and having an edge portion in substantially tangential disposition relative to the periphery of said second roller regardless of the spacing thereof from said first roller, a scraper bar extending between and pivotally mounted on said side walls and having an edge portion in general tangential disposition with the periphery of said first roller, and an unloading pan pivotally mounted on said support arms about the axis of said second roller and having an edge portion in substantially tangential disposition relative to the periphery of said second roller regardless of the spacing thereof from said first roller.

11. Apparatus of the character described comprising, in combination, a support frame having spaced side walls, a first roller extending between and journalled in said walls, a pair of support arms each pivotally mounted on one of said walls, a second roller extending between and journalled in said support arms, said second roller being disposed in parallel adjacent relationship with said first roller and movable relative thereto on said support arms, drive means for providing simultaneous contra-rotation of said rollers, a cam shaft journalled between said side walls, a pair of cams secured to said shaft respectively subjacent one of said support arms, said cams each having a surface of varying radial spacing from said cam shaft and adapted to have said support arms selectively supported on corresponding portions of said surface of said cams, means for selectively rotating said cam shaft for varying the spacing of said rollers, and a loading pan supported on said support arms and having an edge portion in substantially tangential disposition relative to the periphery of said second roller regardless of the spacing thereof from said first roller.

12. Apparatus of the character described comprising, in combination, a support frame having spaced side walls, a first roller extending between and journalled in said walls, a pair of support arms each pivotally mounted on one of said walls, a second roller extending between and journalled in said support arms, said second roller being disposed in parallel adjacent relationship with said first roller and movable relative thereto on said support arms, drive means for providing simultaneous contra-rotation of said rollers, a cam shaft journalled between said side walls, a pair of cams secured to said shaft respectively subjacent one of said support arms, said cams each having a surface of varying radial spacing from said cam shaft and adapted to have said support arms selectively supported on corresponding portions of said surface of said cams, means for selectively rotating said cam shaft for varying the spacing of said rollers, a scraper bar extending between and pivotally mounted on said side walls and having an elongated edge portion in general tangential disposition with the periphery of said first roller, said scraper bar including an elongated transversely extending central portion and upstanding side portions secured adjacent the ends of said central portion, and an unloading pan pivotally mounted on said support arms about the axis of said second roller and having an edge portion in substantially tangential disposition relative to the periphery of said second roller regardless of the spacing thereof from said first roller.

13. Apparatus of the character described comprising, in combination, a support frame having spaced side walls, a first roller extending between and journalled in said walls, a pair of support arms each pivotally mounted on one of said walls, a second roller extending between and journalled in said support arms, said second roller being disposed in parallel adjacent relationship with said first roller and movable relative thereto on said support arms, drive means for providing simultaneous contra-rotation of said rollers, a cam shaft journalled between said side walls, a pair of cams secured to said shaft respectively subjacent one of said support arms, said cams each having a surface of varying radical spacing from said cam shaft and adapted to have said support arms selectively supported on corresponding portions of said surface of said cams, means for selectively rotating said cam shaft for varying the spacing of said rollers, said rollers having the axes thereof in a common plane disposed at substantially a 50° angle from the vertical, said first and second rollers being mounted in vertically spaced relation from each other, and guide means mounted on said frame adjacent the ends of the upper portion of the uppermost of said rollers and operable to guide and center dough passing between said rollers.

14. Apparatus as set forth in claim 11 further defined by guide means for centering sheets of dough between the ends of the rollers as the dough is passed therethrough.

References Cited by the Examiner
UNITED STATES PATENTS

| | | | |
|---|---|---|---|
| 1,521,455 | 12/1924 | Longanesi | 107—12 |
| 2,275,714 | 3/1942 | Antesberger | 107—12 |

FOREIGN PATENTS

| | | |
|---|---|---|
| 1,260 | 5/1871 | Great Britain. |
| 497,980 | 9/1954 | Italy. |
| 89,298 | 9/1958 | Netherlands. |

ROBERT E. PULFREY, *Primary Examiner.*

J. D. BEIN, *Examiner.*